United States Patent [19]

Lim et al.

[11] 4,147,681

[45] Apr. 3, 1979

[54] STABLE, SELF-INVERTING WATER-IN-OIL EMULSIONS

[75] Inventors: Sim Koei Lim, Venetia; Arnold E. Bloomquist, Bethel Park; Raymond J. Schaper, Pittsburgh, all of Pa.

[73] Assignee: Calgon Corporation, Pittsburgh, Pa.

[21] Appl. No.: 853,740

[22] Filed: Nov. 21, 1977

Related U.S. Application Data

[60] Division of Ser. No. 660,886, Feb. 24, 1976, Pat. No. 4,077,930, which is a continuation of Ser. No. 487,931, Jul. 16, 1974, abandoned, which is a continuation-in-part of Ser. No. 402,570, Oct. 1, 1973, abandoned.

[51] Int. Cl.² ............... C08L 33/02; D21H 3/38; C08L 33/14; C08L 33/24
[52] U.S. Cl. ............... 260/29.6 TA; 162/168 N; 260/29.6 WQ; 260/29.6 SQ; 260/29.6 H; 210/54; 526/207; 526/292; 526/303; 526/305; 526/307; 526/287; 260/27 R
[58] Field of Search ............... 260/29.6 HN, 29.6 SQ, 260/29.6 WQ

[56] References Cited

U.S. PATENT DOCUMENTS

| | | | |
|---|---|---|---|
| 2,980,657 | 4/1961 | Melamed | 260/89.7 N |
| 3,147,218 | 9/1964 | Booth et al. | 260/80.3 N |
| 3,284,393 | 11/1966 | Vanderhoff | 260/89.7 R |
| 3,336,269 | 8/1967 | Monagle et al. | 260/80.3 N |
| 3,412,019 | 11/1968 | Hoover et al. | 260/89.7 N |
| 3,624,019 | 11/1971 | Anderson et al. | 260/29.6 H |
| 3,692,673 | 9/1972 | Hoke | 260/79.3 MV |
| 3,806,485 | 4/1974 | Frisque | 260/29.6 WQ |
| 3,920,599 | 11/1975 | Harlock et al. | 260/29.6 H |

OTHER PUBLICATIONS

Griffin – J. Soc. Cosmetic Chem. 1, 311-326, (1949).
Griffin – J. Soc. Cosmetic Chem. 6, 249-256, (1954).
Kirk-Othmer, Encyclopedia of Chemical Technology, vol. 8, 2nd Ed., (1965), Interscience pp. 127-131.
Kirk-Othmer – Encyclopedia of Chem. Tech., 2nd Ed., vol. 8, (1965), p. 120.

*Primary Examiner*—H. S. Cockeram
*Attorney, Agent, or Firm*—Mario A. Monaco; Martin L. Katz; Raymond M. Speer

[57] ABSTRACT

Self-inverting emulsion polymers and their use as drainage aids, retention aids, saveall flotation aids and process water flocculants. The polymers are copolymers and homopolymers based on acrylamide, polymerized in the presence of water, an inert hydrophobic liquid, free radical catalyst and an emulsifier having a HLB of at least 7.

1 Claim, No Drawings

STABLE, SELF-INVERTING WATER-IN-OIL EMULSIONS

This is a division of application Ser. No. 660,886, filed Feb. 24, 1976, now U.S. Pat. No. 4,077,930; which is a continuation of application Ser. No. 487,931, filed July 16, 1974, now abandoned; which is a continuation-in-part of application Ser. No. 402,570, filed Oct. 1, 1973, now abandoned.

This invention relates to emulsion polymers, processes for their preparation and their use as retention aids, drainage aids, saveall flocculants and process water clarification aids in the manufacture of paper.

More particularly, this invention relates to a water-in-oil emulsion polymerization process in which one or more water-soluble monomers are emulsified in an oil phase containing at least 20 percent by weight, based on the oil phase, of an emulsifying agent and polymerized therein in order to obtain stable emulsion polymers that may be inverted upon addition to water without the necessity of other reagents and are useful as retention aids, drainage aids and saveall flocculants in the manufacture of paper and paper products.

The products produced in accordance with the teachings of this invention have numerous advantages. For example, higher initial monomer concentrations may be used thereby resulting in formulations having a higher solids content than that produced by prior art emulsion processes can be obtained without the viscosity buildup normally associated with aqueous solution polymer products. Increased stability and improved shelf life, the ability to feed these products without the necessity of a time-consuming and expensive redispersion in a feed solution and a product having a higher conversion rate of monomer to polymer are other advantages of this invention which are necessary for a commercially successful product. Furthermore, the emulsion products of this invention are self-inverting and do not require admixture with additional surfactants or other reagents in order to be solubilized in water.

The process of this invention may be used to polymerize any water-soluble ethylenically unsaturated monomer or combination of such monomers having a solubility of at least 5 percent in water to produce homo- or copolymers. Copolymers may be defined as any polymer having two or more different mer units. Suitable monomers include acrylamide, methacrylamide, acrylic acid, methacrylic acid, sodium styrene sulfonate, 3-acrylamido-3-methyl butyl trimethyl ammonium chloride, 2-acrylamido-2-methyl propane sulfonic acid, diallyl quaternary ammonium compounds such as dimethyl diallyl ammonium chloride, diethyl diallyl ammonium chloride, 2-acrylamido-2-methyl propyl trimethyl ammonium chloride, 2-methacryloyloxyethyl trimethyl ammonium methosulfate, 3-methacryloyl-2-hydroxy propyl trimethyl ammonium chloride, vinylpyrrolidine, fumaric acid, crotonic acid, maleic acid, methacrylamido propyl trimethyl ammonium chloride, acrylonitrile and vinyl benzyl trimethyl ammonium chloride and other water-soluble vinyl monomers. The preferred monomers, however, are 3-acrylamido-3-methyl butyl trimethyl ammonium chloride, 2-acrylamido-2-methyl propane sulfonic acid, 2-methacryloyloxyethyl trimethyl ammonium methosulfate, acrylamide, acrylic acid and the diallyl quaternary ammonium compounds. When aqueous solutions of the monomers are used, the aqueous phase can contain from about 20 to about 80 percent by weight monomer. However, certain normally liquid monomers such as acrylic acid may be employed at higher concentrations.

As previously stated, the emulsifying agent is present in an amount of at least 20 percent by weight based on the oil phase and can be any conventional water-dispersible, emulsifying agent or mixtures thereof having an HLB of at least 7. The preferred surfactants include ethoxylated nonyl phenols, ethoxylated nonyl phenol formaldehyde resin, dioctyl esters of sodium sulfosuccinate, and octyl phenol polyethoxy ethanol can be used.

Other surfactants that may be employed include the soaps such as sodium and potassium myristate, laurate, palmitate, oleate, stearate, resinate and hydroabietate, the alkali metal alkyl or alkylene sulfates, such as sodium lauryl sulfate, potassium stearyl sulfate, the alkali metal alkyl or alkylene sulfonates, such as sodium lauryl sulfonate, potassium stearyl sulfonate, and sodium cetyl sulfonate, sulfonated mineral oil, as well as the ammonium salts thereof; and salts of high amines like lauryl amine hydrochloride and stearyl amine hydrobromide.

Any anionic, cationic, or nonionic compound can be used as the surfactant. Examples of suitable anionic surfactants are alkali metal, ammonium and amine soaps; the fatty acid part of such soaps contain preferably at least 16 carbon atoms because soaps based on lauric and myristic acids have a great tendency to develop abundant foam.

Other examples of suitable anionic surfactants are alkali metal salts of alkyl-aryl sulfonic acids, sodium dialkyl sulfosuccinate, sulfated or sulfonated oils, e.g., sulfated castor oil; sulfonated tallow and alkali salts of short chain petroleum sulfonic acids.

Examples of suitable cationic surfactants are salts of long chain primary, secondary, or tertiary amines, such as oleylamine acetate, cetylamine acetate, di-dodecylamine lactate, the acetate of aminoethyl-stearamide, dilauroyl triethylene tetraamine diacetate, 1-aminoethyl-2-heptadecenyl imidazoline acetate; and quaternary salts, such as cetylpyridinium bromide, hexadecyl ethyl morpholinium chloride, and diethyl di-dodecyl ammonium chloride.

Examples of suitable nonionic surfactants are condensation products of higher fatty alcohols with ethylene oxide, such as the reaction product of oleyl alcohol with 10 ethylene oxide units; condensation products of alkyl phenols with ethylene oxide, such as the reaction products of isoctylphenol with 12 ethylene oxide units; condensation products of higher fatty acid amides with 5, or more, ethylene oxide units; polyethylene glycol esters of long chain fatty acids, such as tetraethylene glycol monopalmitate, hexaethyleneglycol monolaurate, nonaethyleneglycol monostearate, nonaethyleneglycol dioleate, tridecaethyleneglycol monoarachidate, tricosaethylene glycol monobehenate, tricosaethyleneglycol dibehenate, polyhydric alcohol partial higher fatty acid esters such as sorbitan tristearate, ethylene oxide condensation products of polyhydric alcohol partial higher fatty esters, and their inner anhydrides (mannitol-anhydride, called Mannitan, and sorbitol-anhydride, called Sorbitan), such as glycerol monopalmitate reacted with 10 molecules of ethylene oxide, pentaerythritol monooleate reacted with 12 molecules of ethylene oxide, sorbitan monostearate reacted with 10 to 15 molecules of ethylene oxide; long chain polyglycols in which one hydroxyl group is esterified with a higher fatty acid and the other hydroxy group is etherified with a low molecular alcohol, such as methoxypolyethylene glycol 550 monostearate (550 meaning the average molecular weight of the polyglycol ether). A combination of two or more of these surfactants may be used; e.g., a cationic may be blended with a nonionic or an anionic with a nonionic.

Following is a list of suitable surfactants that could be used in the practice of this invention. Any water-dispersible surfactant could be used, but naturally some are more efficient than others. Useful surfactants include, but are not limited to, sorbitan sesquioleate, polyoxyethylene alkyl phenol, polyoxyethylene (10 mole) cetyl ether, polyoxyethylene alkylaryl ether, polyoxyethylene monolaurate, polyoxyethylene vegetable oil, polyoxyethylene sorbitan monolaurate, polyoxyethylene (40 mole) sorbitol hexaoleate, polyoxyethylene esters or mixed fatty and resin acids, polyoxyethylene sorbitol lanolin derivative, polyoxyethylene (12 mole) tridecyl ether, polyoxyethylene sorbitan esters of mixed fatty and resin acids, polyoxyethylene sorbitan monostearate, polyoxyethylene sorbitan monooleate, polyoxyethylene monostearate, polyoxyethylene (20 mole) stearyl ether, polyoxyethylene (20 mole) oleyl ether, polyoxyethylene (15 mole) tridecyl ether, polyoxyethylene fatty alcohol, polyoxyethylene alkyl amine, polyoxyethylene glycol monopalmitate, polyoxyethylene sorbitan monopalmitate, polyoxyethylene (20 mole) cetyl ether, polyoxyethylene oxypropylene stearate, polyoxyethylene lauryl ether, polyoxyethylene lanolin derivative, sodium oleate, quaternary ammonium derivative, potassium oleate, N-cetyl N-ethyl morpholinium ethosulfate, and pure sodium lauryl sulfate. Prior art processes, as illustrated by U.S. Pat. No. 3,284,393, utilize significantly lower amounts of emulsifying agents and produce products that are less storage stable and have less freeze/thaw stability.

The oil phase may be any inert hydrophobic liquid. A preferred group of organic liquids are the hydrocarbon liquids which include both aromatic and aliphatic compounds. Thus, such organic hydrocarbon liquids as benzene, xylene, toluene, mineral oils, mineral spirits, kerosenes, naphthas and, in certain instances, petrolatums may be used. Preferred oils include Mentor 28, a high boiling parafinic mineral oil marketed by Exxon and Soltrol 200 and Soltrol 220, high boiling parafinic mineral oils marketed by Phillips Petroleum Company.

The amount of oil used in relation to the water to prepare the emulsion may be varied over wide ranges. As a general rule, the amount of water-to-oil may vary between 5:1 to 1:10 with the preferred amount of water-to-oil being in the ratio of 1:1 to 1:10. These ratios are illustrative of emulsions that can be prepared, although it should be understood that the invention is not limited thereby.

Any free radical initiators such as t-butyl peroxy pivalate, benzoyl peroxide, lauroyl peroxide, potassium and ammonium persulfate may be used in amounts ranging from about 0.0000001 to about 1 mole percent. Other mechanisms of initiation such as photolytic or thermal means may be used and still be within the scope of this invention.

The reaction may be carried out at temperatures of from about 0° C. to about 100° C. The preferred range, however, is from about 25° C. to about 75° C. The reaction also may be conducted under subatmospheric or superatmospheric conditions.

In the practice of this invention, a typical procedure may be described as follows. The water-in-oil emulsifying agent is dispersed in the oil phase, while the free radical initiator, when one is used, is dissolved in the oil or monomer phase, depending upon whether an oil or water-soluble initiator is used. An aqueous solution of monomer or mixed monomers or monomer per se is then added to the oil phase with agitation until the monomer phase is emulsified in the oil phase, and the reaction is carried out as indicated above. The order of addition of reaction media ingredients is not important. The reaction is continued with agitation until conversion is substantially complete. A polymeric latex is thereby obtained. It should be noted that there are many variations of the aforementioned procedure that may be utilized. For example, an emulsion of the monomer may be formed and fed incrementally or continuously to a "heel" of the emulsion in the reactor. A batch process in which all components are combined initially is also a practical procedure.

The process of the present invention may be illustrated by the following representative examples.

EXAMPLE 1

Acrylamide/Dimethyl Diallyl Ammonium Chloride (50/50 Weight, 69.5/30.5 Mole Percent)

Acrylamide (AM) (15.0 g.) and dimethyl diallyl ammonium chloride (DMDAAC) (20.0 g. of 75 percent aqueous solution) were dissolved in 25.0 g. distilled water. Tween 85, polyoxyethylene-20-sorbitan trioleate (10.0 g.) and Mineral Spirits (30.0 g., 105° F. flashpoint) were added to the monomer solution and transferred to a 7-ounce pop bottle. The bottle was sealed with a rubber septum-lined cap and purged with $N_2$ for one hour at 25° C. The bottle was then transferred to a wrist action shaker with 50° C. water bath. Polymerization was initiated by addition of 0.05 ml of t-butyl peroxy pivalate (Lupersol 11). The reaction was continued for 16 hours. A stable, easily water-dispersible, water-soluble emulsion copolymer of acrylamide/dimethyl diallyl ammonium chloride, 50/50 weight percent, 69.5/30.5 mole percent was produced.

The following Table I summarizes some acrylamide/dimethyl diallyl ammonium chloride systems which were produced using the batch emulsion polymerization procedure of Example 1. All reactions resulted in stable emulsion products.

The subsequent Table II summarizes additional systems wherein acrylamide was copolymerized by the procedure of Example 1 with monomers other than dimethyl diallyl ammonium chloride and using various oils as the nonaqueous media.

Table I

Some Acrylamide/Dimethyl Diallyl Ammonium Chloride Emulsion Systems Investigated in "Pop Bottles"

| Example | Monomer Percent Dimethyl Diallyl Ammonium Chloride Mole | Wt. | Acrylamide Mole | Wt. | Weight Percent of Total System Total Monomer | Surfactant | Oil | Water | Initial Monomer Conc. in the Water Phase | Oil Phase |
|---|---|---|---|---|---|---|---|---|---|---|
| 1 | 30.5 | 50 | 69.5 | 50 | 30 | 10 | 30 | 30 | 50 | Mineral Spirits (Ashland) (flashpoint 105° F.) |
| 2 | 10 | 20 | 90 | 80 | 30 | 10 | 30 | 30 | 50 | Mineral Spirits (Ashland) (flashpoint 105° F.) |
| 3 | 63 | 80 | 37 | 20 | 30 | 10 | 30 | 30 | 50 | Mineral Spirits (Ashland) (flashpoint 105° F.) |
| 4 | 30.5 | 50 | 69.5 | 50 | 30 | 10 | 30 | 30 | 50 | 140 Solvent (Ashland) (flashpoint 142° F.) |
| 5 | 10 | 20 | 90 | 80 | 30 | 10 | 30 | 30 | 50 | 140 Solvent (Ashland) (flashpoint 142° F.) |
| 6 | 63 | 80 | 37 | 20 | 30 | 10 | 30 | 30 | 50 | 140 Solvent (Ashland) (flashpoint 142° F.) |
| 7 | 30.5 | 50 | 69.5 | 50 | 30 | 10 | 30 | 30 | 50 | Solvent 467 (Ashland) (flashpoint 175° F.) |
| 8 | 30.5 | 50 | 69.5 | 50 | 30 | 10 | 30 | 30 | 50 | Soltrol 170 (Phillips) (flashpoint 175° F.) |
| 9 | 30.5 | 50 | 69.5 | 50 | 30 | 10 | 30 | 30 | 50 | Soltrol 200 (Phillips) (flashpoint 220° F.) |
| 10 | 30.5 | 50 | 69.5 | 50 | 30 | 10 | 30 | 30 | 50 | Mentor 28 (Exxon) (flashpoint 255° F.) |
| 11 | 10 | 20 | 90 | 80 | 30 | 10 | 30 | 30 | 50 | Mentor 28 (Exxon) (flashpoint 255° F.) |
| 12 | 63 | 80 | 37 | 20 | 30 | 10 | 30 | 30 | 50 | Mentor 28 (Exxon) (flashpoint 255° F.) |

Tween 85 was used as the surfactant in all systems; all products were stable emulsions.

Table II

Emulsion Copolymerization of Acrylamide with Monomers Other Than Dimethyl Diallyl Ammonium Chloride — "Pop Bottle" Scale

| Example | Comonomer | Molar Acrylamide/ Comonomer | Oil Phase/ Flashpoint ° F. | % Active Polymer | % Oil | % Tween 85 | Initial Monomer Conc. in the Water Phase |
|---|---|---|---|---|---|---|---|
| 13 | 3-Acrylamido-3-Methyl Butyl Trimethyl Ammonium Chloride | 90/10 | Mineral Spirits/105° | 20 | 30 | 10 | 33.3 |
| 14 | 3-Acrylamido-3-Methyl Butyl Trimethyl Ammonium Chloride | 90/10 | Mineral Spirits/105° | 30 | 30 | 10 | 50.0 |
| 15 | 3-Acrylamido-3-Methyl Butyl Trimethyl Ammonium Chloride | 90/10 | Mineral Spirits/105° | 35 | 20 | 10 | 50.0 |
| 16 | 3-Acrylamido-3-Methyl Butyl Trimethyl Ammonium Chloride | 90/10 | 140 Solvent/142° | 30 | 30 | 10 | 50.0 |
| 17 | 3-Acrylamido-3-Methyl Butyl Trimethyl Ammonium Chloride | 90/10 | Solvent 467/175° | 30 | 30 | 10 | 50.0 |
| 18 | 3-Acrylamido-3-Methyl Butyl Trimethyl Ammonium Chloride | 90/10 | Mentor 28/255° | 30 | 30 | 10 | 50.0 |
| 19 | 3-Acrylamido-3-Methyl Butyl Trimethyl Ammonium Chloride | 83.2/16.8 | 140 Solvent/142° | 30 | 30 | 10 | 50.0 |
| 20 | 3-Acrylamido-3-Methyl Butyl Trimethyl Ammonium Chloride | 80/20 | 140 Solvent/142° | 30 | 30 | 10 | 50.0 |
| 21 | 3-Acrylamido-3-Methyl Butyl Trimethyl Ammonium Chloride | 76.7/23.3 | 140 Solvent/142° | 30 | 30 | 10 | 50.0 |
| 22 | 3-Acrylamido-3-Methyl Butyl Trimethyl Ammonium Chloride | 60/40 | 140 Solvent/142° | 30 | 30 | 10 | 50.0 |
| 23 | 2-Acrylamido-2-Methyl Propyl Sulfonic Acid | 49/51 | Mineral Spirits/105° | 30 | 30 | 10 | 50.0 |
| 24 | 2-Acrylamido-2-Methyl Propyl Sulfonic Acid | 85/15 | Mineral Spirits/105° | 30 | 30 | 10 | 50.0 |
| 25 | 2-Acrylamido-2-Methyl Propyl Sulfonic Acid | 49/51 | 140 Solvent/142° | 26.45 | 30 | 10 | 47.0 |

Table II-continued

Emulsion Copolymerization of Acrylamide with Monomers Other Than Dimethyl Diallyl Ammonium Chloride — "Pop Bottle" Scale

| Example | Comonomer | Molar Acrylamide/ Comonomer | Oil Phase/ Flashpoint ° F. | % Active Polymer | % Oil | % Tween 85 | Initial Monomer Conc. in the Water Phase |
|---|---|---|---|---|---|---|---|
| 26 | 2-Acrylamido-2-Methyl Propyl Sulfonic Acid | 85/15 | 140 Solvent/142° | 28.4 | 30 | 10 | 48.6 |
| 27 | 2-Acrylamido-2-Methyl Propyl Sulfonic Acid | 49/51 | Mentor 28/255° | 26.45 | 25 | 15 | 47.0 |
| 28 | 2-Acrylamido-2-Methyl Propyl Sulfonic Acid | 85/15 | Mentor 28/255° | 28.4 | 28 | 15 | 51.5 |

Tween 85 surfactant was used in all systems; all products were stable emulsions.

EXAMPLE 29

Acrylamide/2-Hydroxy-3-Methacryloyloxy Propyl Trimethyl Ammonium Chloride (90/10 Mole Percent, Batch, 30% Active Solids)

Acrylamide (AM) (21.9 g.) and 2-hydroxy-3-methacryloyloxy propyl trimethyl ammonium chloride (G-Mac) (8.1 g.) were dissolved in distilled water (30.0 g.) and combined with Tween 85 (10.0 g.) and Mineral Spirits (30.0 g.). The reaction was completed according to the procedures of Example 1. A stable emulsion product was obtained.

EXAMPLE 30

Acrylamide/Dimethyl Diallyl Ammonium Chloride (50/50 Weight, 69.5/30.5 Mole Percent, Batch, 30% Active Solids)

Acrylamide (AM) (45.0 g.) and dimethyl diallyl ammonium chloride (DMDAAC) (60.0 g. of 75% aqueous solution) were dissolved in 75.0 g. of distilled water. The monomer solution was combined with Tween 85 (30.0 g.) and Solvent 467 (90.0 g.) in a one-liter resin flask which was equipped with a disk turbine type agitator, reflux condenser, thermometer, nitrogen inlet tube, and water bath.

The system was purged for one hour at 25° C. with nitrogen. The emulsion was then heated to 50° C. and 0.15 ml of Lupersol 11 (75% t-butyl peroxy pivalate) was added. The exothermic reaction was maintained at 60° C. via use of an ice water cooling bath. Polymerization was complete after one half hour at 60° C. The resulting emulsion was stable.

EXAMPLE 31

Acrylamide/Dimethyl Diallyl Ammonium Chloride (50/50 Weight, 69.5/30.5 Mole Percent, Batch, 40% Active Solids)

Acrylamide (AM) (60.0 g.) and dimethyl diallyl ammonium chloride (DMDAAC) (80.0 g. of 75% aqueous solution) were dissolved in 39.0 g. of distilled water. The monomer solution was combined with Tween 85 (30.0 g.) and Solvent 467 (90.0 g.) in a one-liter resin flask. Equipment and procedure were the same as in Example 30. The product emulsion was stable and exhibited a low (3000 cps) viscosity.

EXAMPLE 32

Acrylamide/Dimethyl Diallyl Ammonium Chloride (50/50 Weight, 69.5/30.5 Mole Percent, Incremental Feed of Aqueous Monomer Solution, 40% Active Solids)

Tween 85 (30.0 g.) and Mentor 28 (90.0 g.) were combined in a one-liter resin flask which was equipped with a disk turbine type agitator, reflux condenser, thermometer, nitrogen inlet tube, addition funnel, and water bath. Acrylamide (AM) (60.0 g.) and dimethyl diallyl ammonium chloride (DMDAAC) (80.0 g. of 75% aqueous solution) were dissolved in 39.0 g. of distilled water and transferred to the addition funnel. The system was purged with nitrogen for one hour at 25° C.

The oil/surfactant mixture in the flask was heated to 50° C. and the catalyst (1.5 ml of a 0.1% aqueous solution of ferrous ammonium sulfate followed by 0.2 ml of Lupersol 11, 75% t-butyl peroxy pivalate) was added. The aqueous monomer solution was added to the system over one half hour while maintaining the temperature between 55° and 60° C. by cooling with a water bath. The reaction was held at 55° C. for an additional half hour. The emulsion was stable and had a viscosity of 7500 cps.

EXAMPLE 33

Acrylamide/Dimethyl Diallyl Ammonium Chloride (50/50 Weight, 69.5/30.5 Mole Percent, Continuous Feed of Monomer Emulsion to "Heel", 40% Active Solids)

Reaction charge and equipment were identical to that used in Example 32. However, the emulsion was prepared externally to the reaction flask; 75 g. of the emulsion were transferred to the flask (the heel) and the remaining portion was transferred to the addition funnel. The system was purged for one hour at 25° C.

Polymerization was initiated by addition of 0.5 ml of a 0.1% aqueous solution of ferrous ammonium sulfate followed by 0.05 ml of Lupersol 11. The reaction temperature was maintained between 55° and 60° C. while the remaining emulsion and catalyst was added; two incremental additions of 0.5 ml of the 0.1% FAS solution and 0.05 ml of Lupersol 11 were added, the emulsion was added continuously. The emulsion was stable and exhibited a viscosity of 2000 cps.

EXAMPLE 34

Acrylamide/Dimethyl Diallyl Ammonium Chloride/2-Methacryloyl Ethyl Trimethyl Ammonium Methosulfate (66.5/28.5/5.0 Mole Percent, Continuous Feed of Monomer Emulsion to "Heel", 35% Active Solids)

The reaction was completed by the procedures of Example 33. The charge was: acrylamide—45.9 g.; dimethyl diallyl ammonium chloride—60.0 g. of 75% aqueous solution; 2-methacryloyl ethyl trimethyl ammonium methosulfate—34.5 g. of 40% aqueous solution; distilled water—33.0 g.; Tween 85—30.0 g.; Mentor 28—96.6 g. The final product was a clear liquid having a viscosity of 2000 cps.

EXAMPLE 35

Acrylamide/2-Acrylamido-2-Methyl Propyl Sulfonic Acid (85/15 Mole Percent, Batch)

Borax (0.6 g.) and 50% aqueous sodium hydroxide (7.2 g.) were dissolved in 52.4 g. of distilled water. 2-acrylamido-2-methyl propyl sulfonic acid (2-AMPSA) (20.4 g.) and acrylamide (AM) (39.4 g.) were dissolved in the caustic solution while maintaining the temperature at <20° C. by cooling. The pH of the final solution was adjusted to 8.0; the solution was then combined with Tween 85 (30.0 g.) and Mentor 28 (50.0 g.). The reaction was conducted according to the procedure of Example 31. 0.5 ml of a 0.01% FAS solution and 0.1 ml of Lupersol 11 was used; polymerization was maintained at <68° C. by cooling. The product was a stable emulsion (5000 cps viscosity).

EXAMPLE 36

Acrylamide/2-Methacryloyloxyethyl Trimethyl Ammonium Methosulfate (95/5 Mole Percent, Batch)

Acrylamide (AM) (49.6 g.), 2-methacryloyloxyethyl trimethyl ammonium methosulfate (METAMS) (26.0 g. of a 40% aqueous solution), distilled water (44.4 g.), Tween 85 (30.0 g.), and Mentor 28 (50.0 g.) were combined and reacted according to the procedure of Example 31. The pH of the emulsion was adjusted to 6.0; the maximum temperature reached was 71° C.; the product was a stable emulsion.

EXAMPLE 37

Acrylamide/Acrylic Acid (85/15 Mole Percent, Batch)

Acrylamide (AM) (34.0 g.), acrylic acid (AA) (glacial-6.0 g.), distilled water (57.3 g.), 50% aqueous sodium hydroxide (5.4 g.), Tween 85 (30.0 g.), and Mentor 28 (67.3 g.) were combined, the pH adjusted to 5.0 and reacted according to the procedure of Example 31. The temperature of polymerization was maintained at <63° C. by cooling. The product was a stable emulsion (1500 cps viscosity).

EXAMPLE 38

Acrylamide/Dimethyl Diallyl Ammonium Chloride (25/75 Weight, Batch)

Acrylamide (AM) (50.0 g.), dimethyl diallyl ammonium chloride (DMDAAC) (218.3 g. of 68.7% aqueous solution) and distilled water (39.4 g.) were combined and the pH adjusted (from 5.8) to 6.5. The aqueous monomer solution was combined with Atlas G-1086 (polyoxyethylene-40-Sorbitol hexaoleate) (50.0 g.) and Mentor 28 (142.3 g.) and reacted according to the procedure of Example 31. The temperature of the polymerization was maintained at <68° C. The product was a stable emulsion (viscosity 3960 cps.).

EXAMPLE 39

Acrylamide (AM) (50.0 g.) was dissolved in distilled water (75.0 g.) and transferred to an addition funnel. Mentor 28 (87.5 g.), Tween 85 (31.4 g.) and Span 85 (6.1 g.) were combined in a 500 ml resin flask equipped as in Example 30. The system was purged with $N_2$ for one hour at 50° C. Catalyst, 3 ppm $Fe^{+2}$ and 6.5 moles t-butyl peroxy pivalate/mole monomer were added to the oil/surfactant combination in the flask. One-sixth of the monomer solution was added to the flask. The remaining monomer solution was added over one hour while maintaining the temperature between 48° and 53° C. The reaction mixture was then held at 50° C. for one hour. The product emulsion was homogeneous and had a Brookfield viscosity of <5000 cps.

EXAMPLE 40

Acrylamide (AM) (69.5 g.) was dissolved in distilled water (75.0 g.) and transferred to an addition funnel which was placed on a 500 ml resin flask which was equipped as in Example 30. Mentor 28 (80.5 g.), Tween 85 (36.4 g.) and Span 85 (13.6 g.) were combined in the flask. The reaction was then conducted as described in Example 39.

EXAMPLE 41

Dimethyl diallyl ammonium chloride (DMDAAC) (53.5 lbs. of 71% aqueous solution), diethyl diallyl ammonium chloride (DEDAAC) (2.62 lbs. of 76.7% aqueous solution) and acrylamide (AM) (40 lbs.) were combined in 20.1 lbs. of distilled water in an agitated stainless steel purge tank and stirred to obtain a homogeneous solution while maintaining the temperature at 20° to 25° C. Mentor 28 (63.7 lbs.) was combined with 20 lbs. of Tween 85 in a 30 gallon Star Reactor and brought to 55° C. Both mixtures were purged for one hour with $N_2$.

Lupersol 11 (75% t-butyl peroxy pivalate), 33.5 ml, was added to the oil/surfactant in the reactor. The first third of the monomer mix was then fed into the reactor at ca. 0.2 to 0.4 lbs./minute while maintaining the reaction temperature at 55° to 60° C. Lupersol 11 (33.5 ml) was added again and the second third of the monomer mix fed in as before. The final third of catalyst and monomer mix were added in like manner.

After the final monomer mix had been added, an additional 25 ml of catalyst was added and the reaction maintained at 55° to 60° C. for two hours. The product was a stable emulsion having a Brookfield viscosity of 1500 cps.

EXAMPLE 42

Dimethyl diallyl ammonium chloride (DMDAAC) (53.5 lbs. of 71% aqueous solution), diethyl diallyl ammonium chloride (DEDAAC) (2.62 lbs. of 76.7% solution), acrylamide (AM) (38.2 lbs.) and acrylic acid (AA) (1.76 lbs. of glacial) were combined in a 20.0 lbs. of distilled water in an agitated stainless steel purge tank and stirred to obtain a homogeneous solution. The pH was adjusted to 6.5 with dilute caustic; temperature was maintained at 20° to 25° C. throughout the operation. Mentor 28 (63.7 lbs.) was combined with 20 lbs. of Tween 85 in a 30 gallon Star Reactor and brought to 55° C. Both mixtures were purged with $N_2$ for one hour.

The reaction was completed employing the procedures and quantities described in Example 41. The product was a stable emulsion which exhibited a Brookfield viscosity of ca. 1700 cps.

EXAMPLE 43

Acrylamide/2-Acrylamido-2-Methyl Propyl Sulfonic Acid (90/10 Mole Percent)

34.0 grams of Mentor 28, 9.0 grams of Atlas G-1086 (polyoxyethylene-40 -sorbitol hexaoleate) and 1.0 gram of Arlacel C (sorbitan sesquioleate) were mixed in a 500 ml resin flask and purged with nitrogen gas for ½ hour at 25° C. 19.5 grams of distilled water was mixed with 3.0 grams of 50% NaOH solution and 25.4 grams of acrylamide and 8.1 grams of 2-acrylamido-2-methyl propyl sulfonic acid were dissolved in the dilute caustic solution at 20° C. The pH of the solution was adjusted to 4.3 and 5.6 grams of the solution was added to the solvent/surfactant under stirring at 500 rpm with a disc turbine blade. The temperature was gradually raised to 30° C. and 0.06 ml Lupersol 11, followed by 0.17 ml of 6 percent Cobalt solution was added. When the polymerization temperature reached 38° C., the residual monomer solution was added. The temperature was held between 40° to 45° C. by cooling. Total addition time is approximately one hour. After the addition of the monomer, the emulsion was held at 45° C. for ½ hour. The Brookfield viscosity of the emulsion was 300 cps. and of a 0.1% aqueous solution was 150 cps.

EXAMPLE 44

Acrylamide/2-Acrylamido-2-Methyl Propyl Sulfonic Acid (95/5 Mole Percent)

32.0 grams of Mentor 28, 9.0 grams of Atlas G-1086 and 1.0 gram of Arlacel C was mixed in a 500 ml resin flask and purged with nitrogen gas for ½ hour at 25° C. 1.5 grams of 50% NaOH solution was mixed with 22.25 grams of distilled water and 29.8 grams of acrylamide and 4.45 grams of 2-acrylamido-2-methyl propyl sulfonic acid were dissolved in the dilute caustic solution at 20° C. The pH of the solution was adjusted to 6.5 and 5.8 grams of this solution was added to the solvent/surfactant under constant stirring with a disc turbine blade at 500 rpm. The emulsion was heated to 45° C. and 0.83 ml of Lupersol 11 was added. After initiation, the remaining monomer solution was added within one hour. The temperature during the polymerization was kept below 50° C. by cooling. After the addition of monomer, the emulsion was held at 50° C. for ½ hour. The resulting emulsion was stable and had a Brookfield viscosity of 350 cps.

EXAMPLE 45

Acrylamide 40 grams of Soltrol 220, 8.6 grams of Atlas G-1086 and 1.4 grams of Arlacel 83 (HLB = 9.25) were mixed in a 500 ml flask with stirring. 25 grams of acrylamide were dissolved in 25 grams of distilled water and added to the oil/surfactant mixture and purged for one hour with nitrogen gas at room temperature. The mixture was then heated to 40° C. and $6.5 \times 10^{-4}$ moles of t-butyl peroxypivalate per mole of monomer was added and the temperature maintained between 40° and 50° C. for approximately one hour.

EXAMPLE 46

Acrylamide 30 grams of Soltrol 220, 8.6 grams of Atlas G-1086 and 1.4 grams of Arlacel 83 (HLB = 9.25) were added with stirring to a 500 ml flask. 30 grams of acrylamide were dissolved in 25 grams of distilled water and 25 ml of the solution was added to the oil/surfactant mixture and purged with nitrogen gas for one hour at room temperature. The mixture was then heated to 30° C. and $8.5 \times 10^{-5}$ moles of t-butyl peroxypivalate per mole of monomer was added and the temperature maintained between 35° and 40° C. for approximately one hour. During the reaction, the monomer mixture was purged with nitrogen gas at room temperature and after the exotherm subsided, the remaining portion of the monomer solution was added to the reaction mixture and was then held for one hour at 35° C.

EXAMPLE 47

Acrylamide/Sodium Acrylate (75/25 Mole Percent)

77.8 grams of Soltrol 220, 21.4 grams of Atlas G-1086 and 3.6 grams of Arlacel 83 (HLB = 9.25) were mixed in a 500 ml flask with stirring. 61.3 grams of acrylamide and 20.7 grams of glacial acrylic acid were dissolved in a mixture of 42.2 grams distilled water and 23.0 grams of a 50% NaOH solution and added to the oil/surfactant mixture and purged for one hour with nitrogen gas at room temperature. The mixture was then heated to 40° C. and $6.5 \times 10^{-4}$ moles of t-butyl peroxypivalate per mole of monomer was added and the temperature maintained between 40° and 50° C. for approximately one hour.

As previously indicated, the emulsion polymers of this invention are useful as drainage aids, retention aids and saveall flocculants in the manufacture of paper and paper based products. As used herein, the term paper means a product formed from a wet-laid web of fibrous materials such as wood, bagasse, synthetic polymers as for polypropylene, polyethylene and similar materials, and any combination thereof.

For the formation of the web in a paper-making process, water in a pulp slurry is drained through a wire screen leaving the pulp fibers on top, and the rate of the drainage has a direct concern with the efficiency of paper production. It has long been known that the addition of aluminum sulfate to pulp slurry facilitates the water drainage from the web on a wire screen. Various water-soluble polymers have been proposed as additives which impart more effective drainage to paper web than the aluminum sulfate. It is believed that these additives bond pulp fibers so that water may pass through the bonded fibers. By this bonding action, however, these additives sometimes take up unwanted fillers and fine fibers within the web thereby depressing the drainage. Further, these additives may contaminate a wire screen, felt or dryers by adherence thereto, or may damage the texture of paper. Therefore, careful selection and control are required when these additives are used.

In this use, the emulsion polymers of the present invention are continuously added to a pulp slurry so that the mixture will contain from about 0.001 to about 1 percent, preferably from about 0.005 to about 0.25 percent, based on the dry weight of the pulp fibers therein, of the polymer. The pulp slurry is then fed to a wire screen belt or cylindrical screen of a sheeting machine where water in the slurry is drained through the screen leaving the pulp fibers as a paper web on the screen. The purpose of the polymer is to increase the rate of water drainage and/or to improve the formation of said sheet.

The following example illustrates the effectiveness of the emulsion polymers of this invention as drainage aids.

EXAMPLE 48

The effectiveness of these materials as a drainage aid was evaluated on lab-scale via use of a standard Schopper-Riegler Freeness Tester. Standard laboratory procedures were employed.

Generally, the furnish for evaluation is prepared by mixing the required amount of dry-lap pulp(s) and water using a lightning mixer. Consistency at this point is usually ca. 1.5 and ca. 10 minutes mixing time is required. The furnish is then transferred to a Valley Beater and slurried without weights for 10–20 minutes. Weights are subsequently added and the furnish allowed to beat until the desired freeness is obtained. For example, after about 30 minutes beating, a Kraft furnish will have reached ca. 350 ml Schopper-Riegler Freeness.

The beaten pulp is transferred to a clean container and diluted to a suitable working consistency usually 0.2. If more than one pulp is employed in the furnish, mixing is accomplished. pH is adjusted to the desired value and any additives such as alum, etc. are added at this point and thoroughly mixed.

A one-liter aliquot of the final stock slurry is collected into a graduated cylinder. The drainage aid is pipeted into the sample as a dilute aqueous solution to the desired feed rate and mixed thoroughly. The freeness of the stock and drainage aid is compared to that of stock only via use of the Schopper-Riegler Freeness Tester. Typical lab results are summarized in the following tables.

Table III

Drainage Performance of Acrylamide (AM)/Dimethyl Diallyl Ammonium Chloride (DMDAAC), Acrylamide/3-Acrylamido-3-Methyl Butyl Trimethyl Ammonium Chloride (AMBTAC) Emulsions (Mentor 28) in a 100% Old Corrugated Furnish

| Composition | pH 8.8 Schopper-Riegler Freeness (ml) | pH 6.5 Schopper-Riegler Freeness (ml) |
|---|---|---|
| Control, no additive | 490 | 510 |
| AM/AMBTAC 90/10 | 740 | 760 |
| AM/DMDAAC 50/50 | 720 | 720 |
| AM/DMDAAC 80/20 | 700 | 690 |
| AM/DMDAAC 25/75 | 600 | 570 |
| Am/2-Acrylamido-2-Methyl Propyl Sulfonic Acid 85/15 | 520 | 650 |

Furnish:
100% Old Corrugated, 2 g/l
6.5 pH adjusted with $H_2SO_4$
Polymer Feed Rate: 1 lb./ton

Table IV

Drainage Performance of Acrylamide (AM)/Dimethyl Diallyl Ammonium Chloride (DMDAAC), Acrylamide/3-Acrylamido-3-Methyl Butyl Trimethyl Ammonium Chloride (AMBTAC) Emulsions (Mentor 28) in a 50/50 News/Old Corrugated, pH 6.5

| Composition | Feed Rate (lbs./ton) | Schopper-Riegler Freeness (ml) |
|---|---|---|
| Blank | 0 | 300 |
| AM/DMDAAC 50/50 | 1.0 | 570 |
| AM/DMDAAC 50/50 | 0.5 | 460 |
| AM/DMDAAC 50/50 | 0.25 | 360 |

Table IV-continued

Drainage Performance of Acrylamide (AM)/Dimethyl Diallyl Ammonium Chloride (DMDAAC), Acrylamide/3-Acrylamido-3-Methyl Butyl Trimethyl Ammonium Chloride (AMBTAC) Emulsions (Mentor 28) in a 50/50 News/Old Corrugated, pH 6.5

| Composition | Feed Rate (lbs./ton) | Schopper-Riegler Freeness (ml) |
|---|---|---|
| AM/AMBTAC 90/10 | 1.0 | 660 |
| AM/AMBTAC 90/10 | 0.5 | 550 |
| AM/AMBTAC 90/10 | 0.25 | 440 |
| AM/DMDAAC 80/20 | 1.0 | 490 |
| AM/DMDAAC 80/20 | 0.5 | 450 |
| AM/DMDAAC 80/20 | 0.25 | 340 |

Table V

Drainage Performance of Acrylamide (AM)/Dimethyl Diallyl Ammonium Chloride (DMDAAC), Acrylamide/3-Acrylamido-3-Methyl Butyl Trimethyl Ammonium Chloride (AMBTAC) Emulsions (Mentor 28) in a 50/50 News/Old Corrugated, pH 4.5 (Alum)

| Composition | Feed Rate (lbs./ton) | Schopper-Riegler Freeness (ml) |
|---|---|---|
| Blank | 0 | 250 |
| AM/DMDAAC 50/50 | 1.0 | 570 |
| AM/DMDAAC 50/50 | 0.5 | 470 |
| AM/DMDAAC 50/50 | 0.25 | 370 |
| AM/AMBTAC 90/10 | 1.0 | 610 |
| AM/AMBTAC 90/10 | 0.5 | 480 |
| AM/AMBTAC 90/10 | 0.25 | 340 |
| AM/DMDAAC 80/20 | 1.0 | 500 |
| AM/DMDAAC 80/20 | 0.25 | 320 |
| AM/AMBTAC 90/10 | 1.0 | 570 |
| AM/AMBTAC 90/10 | 0.5 | 470 |

Table VI

Drainage Performance of Acrylamide (AM)/Dimethyl Diallyl Ammonium Chloride (DMDAAC)/Diethyl Diallyl Ammonium Chloride (DEDAAC)[a] Emulsions in 100% Old News Furnish

| Sample Number | Percent Increase Over Blank (No Aid) | | | |
|---|---|---|---|---|
| | pH = 4.5 | | pH = 7.2 | |
| | 1.0 #/ton | 1.5 #/ton | 1.0 #/ton | 1.5 #/ton |
| 0424 | 43 | | 48 | |
| 0502 | 43 | 50 | 45 | 76 |
| 0619 | 33 | 40 | 39 | 67 |
| 0716 | 29 | 38 | 33 | 64 |
| 0802 | 36 | 40 | 42 | 64 |
| 0814 | 31 | | 39 | |
| 0817 | 33 | 40 | 42 | |
| 0821 | 31 | | 39 | |
| 0822 | 33 | | | |
| 0823 | 33 | | 45 | |
| 0824 | 33 | | 45 | |
| 0825 | 33 | | 42 | |
| 0826 | 31 | 40 | 42 | 70 |
| 0803[b] | 43 | | 39 | |
| 0827[b] | 40 | | 42 | |
| 0828[b] | 45 | 57 | 45 | 70 |

[a] (50/47.5/2.5 w/w ratio)
[b] (47.8/2.2/47.5/2.5)
AM/AA/DMDAAC/DEDAAC
AA is acrylic acid.
Blanks indicate evaluations not conducted.

Many papers, except the absorbent types, filter papers, and most packaging papers, must have a finely ground filler added to them, the purpose of which is to occupy the spaces between the fibers, thus giving a smooth surface, a more brilliant whiteness, improved printability and improved opacity. The fillers are normally inorganic substances and may be either naturally occurring materials such as talc, agalite, pearl filler, barytes and certain clays such as china clay or artificial fillers such as suitably precipitated calcium carbonate, crown filler (pearl hardening), blanc fixe, and titanium dioxide pigments. These polymers may also be successfully used to enhance the retention of synthetic fillers.

The polymers of this invention may also be used to increase the retention of fillers, fiber fines, and/or other such additives. For this purpose, the polymers are added to the paper-making system in the manner described prior to Example 43. The polymer is added such that the pulp slurry will contain from about 0.001 to about 0.5 percent, preferably from about 0.005 to about 0.25 percent, based on the dry weight of the pulp fibers.

The following example illustrates the effectiveness of the emulsion polymers of this invention as retention aids.

EXAMPLE 49

The utility of the (co) polymers described herein was evaluated in the lab using a standard Noble-Wood Handsheet machine. Percent retention of such pigments as clay and/or $TiO_2$ is determined by ashing the handsheet to determine the amount of pigment retained in the sheet with respect to the amount fed. The efficiency of the retention aid was determined via comparison of percent retention with the additive RA versus retention of a control wherein no retention aid was used.

Stock is prepared according to the general procedure outlined in Example 43. In the normal operating procedure, stock for evaluation of retention aids is beaten to 300 to 350 ml Schopper-Riegler Freeness and includes pigment (usually ca. 13% clay and 2% $TiO_2$ based on the consistency). An extra 10 minute mixing is utilized to disperse the clay and $TiO_2$.

In evaluation of retention aids, the headbox of the Noble-Wood Handsheet machine is made up to 19 liters at a consistency of 0.4 (as opposed to the 0.2 used in drainage evaluation). The stock is drawn off at the rate of 500 ml per handsheet (2 g. per handsheet or 30 lbs./3,000 ft.$^2$). The retention aid (if any) is pipeted into the 500 ml sample at the desired feed rate and mixed for 30 seconds.

The stock sample is transferred to the deckle box which contains ca. 13 liters of water and dispersed. The handsheet is subsequently prepared by draining off the water and collecting the pulp on a standard 8" × 8" wire. The handsheet is pressed and drum dryed at 232° F. to reach ca. 5% moisture. The sheet is weighed and ashed at 900° C. Percent retention is calculated from the original weight of the handsheet, the percent of pigment in the furnish and the percent ash from the handsheet.

Table VII

Retention Performance of Lab Prepared Acrylamide (AM)/ Dimethyl Diallyl Ammonium Chloride (DMDAAC) Emulsions in a 50/50 HWK/SWK Furnish

| | Percent Retention | | | | | |
|---|---|---|---|---|---|---|
| | pH 4.5 | | | pH 8.8 | | |
| Composition | 0.25 #/ton | 0.35 #/ton | 0.5 #/ton | 0.25 #/ton | 0.35 #/ton | 0.5 #/ton |
| 50/50 AM/DMDAAC | 54.4 | 52.1 | 52.8 | 55.1 | 53.6 | 61.3 |
| 90/10 AM/AMBTAC | 51.8 | 72.8 | 78.2 | 60.5 | 67.4 | 68.9 |

Furnish: 50/50 HWK/SWK
350 Schopper-Riegler Freeness
13% Clay
2% $TiO_2$
2% Alum ⎫
1% Rosin ⎭ Acid System Only
Polymer Feed Rate: 0.25, 0.35, 0.5 lbs./ton
Sheet Weight: 30 lbs./3,000 ft.$^2$
Polymer Solution: 1 g/l
% Retention Without Polymer: pH 4.5 = 26.8
pH 8.8 = 27.6

Table VIII

Retention Performance of Acrylamide (AM)/Dimethyl Diallyl Ammonium Chloride (DMDAAC), Acrylamide/3-Acrylamido-3-Methyl Butyl Trimethyl Ammonium Chloride (AMBTAC) Emulsions (Mentor 28) in a 50/50 HWK/SWK Furnish

| Composition | pH 8.5 % Retention | pH 4.6 % Retention |
|---|---|---|
| (no Polymer) | 7.7 | 17.6 |
| AM/AMBTAC 90/10 Mole | 64.4 | 64.4 |
| AM/DMDAAC 50/50 Wt. | 65.9 | 59.8 |
| AM/DMDAAC 80/20 Wt. | 61.3 | 56.7 |
| Am/2-Acrylamido-2-Methyl Propyl Sulfonic Acid (85/15) | 14.6 | 54.4 |
| AM/AA/DMDAAC (47.8/2.2/50) | 49.8 | 61.3 |

Furnish: 50/50 Hardwood/Softwood Kraft
Schopper-Riegler Freeness 630 mls
13% Clay
2% $TiO_2$
2% Alum ⎫
1% Rosin ⎭ Acid Only
pH 8.5, 4.6
Polymer Feed Rate: 0.35 lbs./ton
Sheet Weight: 30 lbs./3,000 ft.$^2$
Polymer Solution: 1 g/l Table IX Retention Performance of Acrylamide (AM)/Dimethyl Diallyl Ammonium Chloride (DMDAAC)/Diethyl Diallyl Ammonium Chloride (DEDAAC)* Emulsions in 50/50 HWK/SWK Furnish**

| Sample Number | Percent Retention | | | |
|---|---|---|---|---|
| | pH = 4.5 | | pH = 7.2 | |
| | 0.1 #/ton | 0.5 #/ton | 0.1 #/ton | 0.5 #/ton |
| Blank | 52.3 | | 53.7 | |
| 0826 | 67.5 | 70.0 | 70.2 | 73.0 |
| 0828 | 64.3 | 69.5 | 69.0 | 70.3 |
| 0424 | 62.5 | 68.7 | 68.6 | 74.2 |
| 0619 | 59.8 | 65.3 | 65.8 | 71.6 |
| 0827 | 65.8 | | 66.8 | 70.0 |

*(50/47.5/2.5) AM/DMDAAC/DEDAAC
**350 ml Schopper-Riegler Freeness; 13% clay; 2% $TiO_2$ 2% Alum and 1% Rosin in Acid Furnish There are many process water streams in a paper mill operation wherein the use of these emulsion polymers are beneficial. These applications involve the use of the polymers as clarification aids, flotation aids, etc. to improve the efficiency of solids/liquids separations.

Preliminary evaluations have shown these polymers to be effective processing aids for green liquor, white liquor, and brown liquor encountered in the pulping operation. Further, these polymers have been shown to be effective flotation aids in improving the efficiency of the saveall recovery unit commonly employed in converting mills to improve recovery (and reuse) of solid additives to the furnish such as clay, titanium dioxide and other suitable additives. In these applications, the polymers are commonly added at such a level to provide 0.0001% to 0.05%, preferably from 0.0001% to 0.005%, polymer based on solids being treated.

The following example illustrates the effectiveness of the emulsion polymers of this invention as saveall flocculants.

EXAMPLE 50

The effectiveness of (co) polymers as clarification aids in flotation saveaIls is evaluated on lab scale according to the following procedure. Stock is prepared according to the procedures of Example 43. A pigment, if used, is added in the manner described in Example 44. The final consistency of the stock used in these evaluations is 0.2.

An aliquot (700 mls) of the working stock is transferred to a 2-liter stainless steel cylinder which is equipped with a pressure valve. The cylinder is closed off, pressurized to 30 psi and shaken for ca. 30 seconds. The aqueous polymer solution is added to a clean 1-liter graduated cylinder. The discharge tube of the pressurized cylinder is utilized to "shoot" the pulp into the graduated cylinder containing the clarification aid. The dividing line between the pulp and the white water and the clarity of the white water is measured at 1, 2 and 3 minutes. A final reading is taken at 5 minutes. As in previous examples, the effectiveness of the clarification aid is determined by comparison to a control in which no aid was used.

Table X

| Composition | ppm | ml of Floc Rise After Polymer Addition | | | Final Vol. After |
|---|---|---|---|---|---|
| | | 1 min. | 2 min. | 3 min. | 5 min. |
| None | 0 | 200 | 500 | 550 | 100 |
| 50/50 AM/ DMDAAC | | | | | |

Table X-continued

| Composition | ppm | ml of Floc Rise After Polymer Addition | | | Final Vol. After |
|---|---|---|---|---|---|
| | | 1 min. | 2 min. | 3 min. | 5 min. |
| Emulsion | 5 | 570 | 620 | 640 | 5 |

AM is Acrylamide
DMDAAC is Dimethyl Diallyl Ammonium Chloride
INfluent from Saveall of No. 25 Paper Machine: pH 3.7
Machine Furnish: 60/40 GWD/Kraft
Apparatus: Merck Flotation Test Cell The following tables illustrate the stability and shelf-life of a representative emulsion product of the instant invention which consists of 47.5 weight percent of DMDAAC, 2.5 weight percent of DEDAAC and 50 weight percent of acrylamide.

Table XI

| Viscosity vs. Temperature | |
|---|---|
| *Brookfield Viscosity (cps) | Temperature (° C.) |
| 7,500 | −10° |
| 7,200 | 0 |
| 7,100 | 10 |
| 7,100 | 24 |
| 7,000 | 30 |
| 5,200 | 50 |
| 3,800 | 60 |

Brookfield Viscosity Model LVF
*Spindle 3–12 rpm

Table XII

| Freeze Thaw Stability |
|---|
| No adverse effects in viscosity, appearance or color after seven cycles of −20° C. to 24° C. |

Table XIII

| Shelf Life |
|---|
| Shelf Life vs. Time — at least 6 months |
| After 6 months, no increase in viscosity and no decrease in performance |
| Shelf Life vs. Temperature (140° F.) — at least 6 months |
| After 6 months, no increase in viscosity and no decrease in performance. |

We claim:

1. A stable, self-inverting water-in-oil acrylamide, acrylamide/acrylic acid, acrylamide/2-acrylamido-2-methyl propane sulfonic acid, acrylamide/3-acrylamido-3-methyl butyl trimethyl ammonium chloride or acrylamide/2-methacryloyloxyethyl trimethyl ammonium methosulfate polymer-containing emulsion prepared by a process which comprises polymerizing the corresponding monomer or monomers at a temperature at from about 0° to about 100° C. with agitation in the presence of water, an inert hydrophobic liquid and a free radical catalyst, and also in the presence of at least 20 percent by weight, based on the weight of the oil phase, of an emulsifier having an HLB of at least 7, and continuing the polymerization until the reaction is substantially complete.

* * * * *